(12) United States Patent
Yoneda

(10) Patent No.: US 8,096,692 B2
(45) Date of Patent: Jan. 17, 2012

(54) SURFACE LIGHT-EMITTING DEVICE AND AUTOMATED TRANSACTION APPARATUS USING THE SAME

(75) Inventor: Yutaka Yoneda, Kahoku (JP)

(73) Assignee: PFU Limited, Ishikawa (JP)

( * ) Notice: Subject to any disclaimer, the term of this patent is extended or adjusted under 35 U.S.C. 154(b) by 337 days.

(21) Appl. No.: 12/424,040

(22) Filed: Apr. 15, 2009

(65) Prior Publication Data

US 2009/0290379 A1 Nov. 26, 2009

(30) Foreign Application Priority Data

May 22, 2008 (JP) .................................. 2008-134721

(51) Int. Cl.
*F21V 7/04* (2006.01)
(52) U.S. Cl. .......... 362/602; 362/26; 362/612; 362/613; 362/619; 362/620
(58) Field of Classification Search ............... 362/26, 362/602, 612, 613, 619, 620; 349/65; 385/901
See application file for complete search history.

(56) References Cited

U.S. PATENT DOCUMENTS

| 6,231,200 B1 * | 5/2001 | Shinohara et al. | 362/619 |
| 7,121,709 B2 * | 10/2006 | Shinohara et al. | 362/612 |
| 7,794,129 B2 * | 9/2010 | Tien et al. | 362/612 |
| 7,824,092 B2 * | 11/2010 | Yang et al. | 362/619 |

FOREIGN PATENT DOCUMENTS

JP 11-066252 3/1999

* cited by examiner

*Primary Examiner* — Stephen F Husar
(74) *Attorney, Agent, or Firm* — Staas & Halsey LLP

(57) ABSTRACT

A surface light-emitting device includes a transparent plate having two main surfaces and a light source. The light source is arranged adjacent to a side of the transparent plate so that the light source radiates light to the inside of the transparent plate from the side of the transparent plate. One main surface of the transparent plate is formed with a plurality of cone-shaped dimples, which reflect radiated light toward the other main surface of the transparent plate. The surface light-emitting device may further include a black sheet arranged adjacent to one main surface of the transparent plate formed with the plurality of cone-shaped dimples. The surface light-emitting device can be used as a guide device for an input/output interface unit of an automated transaction apparatus.

12 Claims, 6 Drawing Sheets

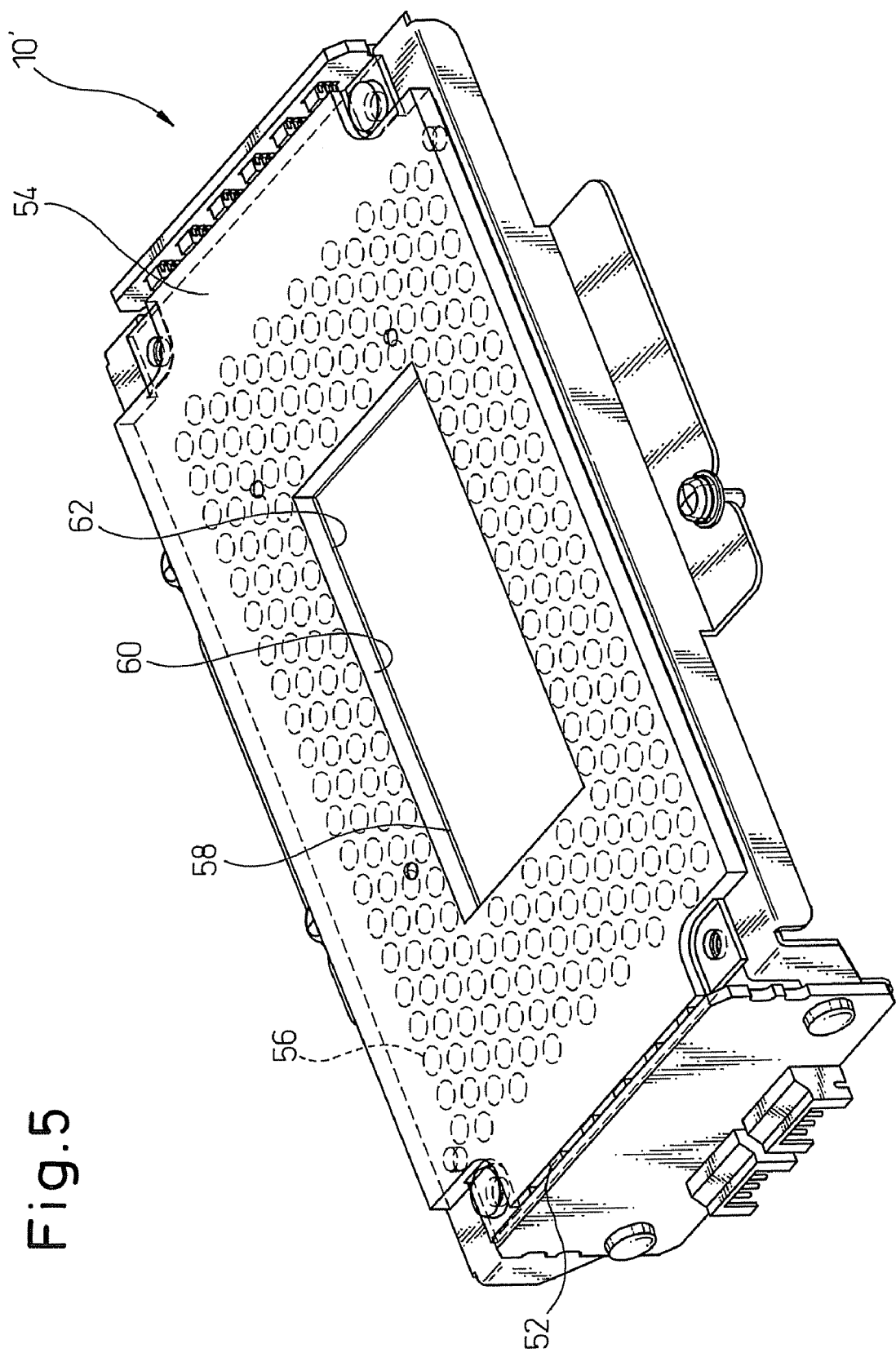

SURFACE LIGHT-EMITTING DEVICE AND AUTOMATED TRANSACTION APPARATUS USING THE SAME

BACKGROUND OF THE INVENTION

1. Field of the Invention

The present invention relates to a surface light-emitting device for emitting light from a surface having a wide area and an automated transaction apparatus using the surface light-emitting device.

2. Description of the Related Art

In automated transaction apparatuses such as automated teller machines (ATM) at banks and information kiosk terminals at convenience stores, as described, for example, in Japanese Unexamined Patent Publication No. 11-66252, a guide lamp is often provided in the vicinity of each of input/output interfaces such as a paper discharge port of a printer, a card insertion hole of a magnetic card reader, a non-contact IC card port and an image scanner to guide an operator by indicating an input/output interface to be operated with light radiation. Generally, such a guide lamp is formed of a transparent acryl member or the like fitted in the vicinity of the input/output interface and a light source arranged behind the transparent acryl or the like and emitting the light as required.

To facilitate the recognition of the input/output interface by the operator, each guide lamp is preferably sufficiently large to emit light from a wide surface. However, to emit light from a wide surface, a plurality of LEDs or lamps have to be arranged in a matrix in a plane, and therefore, a great number of LEDs or lamps are required. Further, to emit light from an annular surface around the card insertion hole of the magnetic card reader or the paper discharge port of the printer or from a card port surface itself of the non-contact IC card port, a light source such as an LED has to be arranged behind the transparent acrylic member. However, since a printer unit, a magnetic card reader unit, a communication unit and a scanner unit are provided inside the transaction apparatus behind the paper discharge port of the printer, the card insertion hole of the card reader, the card port surface of the non-contact IC card port and the scan surface of the image scanner, respectively, the light source cannot be arranged freely and it is difficult to emit light from a wide area.

SUMMARY OF THE INVENTION

Accordingly, it is an object of the present invention to overcome the above problems of the prior art and to make it possible to emit light from a surface having a wide area even in the case where other devices are disposed behind the desired light-emitting surface.

In order to achieve the object described above, according to one aspect of the present invention, there is provided a surface light-emitting device for emitting light from a surface having a wide area, which includes a transparent plate having two main surfaces and a light source, wherein the light source is arranged adjacent to a side of the transparent plate so that the light source radiates light to the inside of the transparent plate from the side of the transparent plate, and one main surface of the transparent plate is formed with a plurality of cone-shaped dimples which reflect radiated light toward the other main surface of the transparent plate.

As light is radiated to the inside of the transparent plate from the light source arranged adjacent to the side of the transparent plate, light is reflected in a direction perpendicular to the main surface of the plate by the cone-shaped surfaces of the dimples formed on one of the main surfaces of the plate. Therefore, light is emitted from the entire plate surface so as to illuminate the entire plate. Further, since the light source is arranged adjacent to the side of plate and not required to be arranged behind the plate, other devices can be arranged behind the plate.

The surface light-emitting device described above preferably further includes a back sheet arranged adjacent to the one main surface formed with the plurality of cone-shaped dimples.

The plurality of cone-shaped dimples include dimples having different sizes.

Further, the plurality of cone-shaped dimples are preferably arranged so as to display a predetermined pattern on the other main surface of the transparent plate.

An opening may be formed at the center of the transparent plate.

Furthermore, the transparent plate may be made of a transparent plastic material.

According to another aspect of the present invention, there is provided an automated transaction apparatus using the surface light-emitting device described above as a guide device for an input/output interface unit.

In the automated transaction apparatus described above, the surface light-emitting device is preferably arranged so as to surround the input/output interface unit. Further, the automated transaction apparatus may be an information kiosk terminal.

In this specification, the term "automated transaction apparatus" is defined to include an automated teller machines (ATM) installed at a bank and an information kiosk terminal used to provide a reception or guidance service at hospitals or companies or to provide specified services at convenience stores or the like.

According to the present invention, light radiated to the inside of the transparent plate from the light source arranged adjacent to the side of the transparent plate is reflected in the direction perpendicular to the main surface of the plate by the cone-shaped dimples formed on one of the main surfaces of the transparent plate. Therefore, light can be emitted from the entire plate surface so as to illuminate the entire plate. Further, since the light source is arranged adjacent to the side of the transparent plate, other devices can be arranged behind the transparent plate. Therefore, for example, with a communication unit arranged behind the non-contact IC card port, the entire surface of the non-contact IC card port can be illuminated.

BRIEF DESCRIPTION OF THE DRAWINGS

The above and other objects, features and advantages of the present invention will be described below in more detail with reference to the accompanying drawings, in which:

FIG. 5 is a perspective view showing a surface light-emitting device according to another embodiment of the present invention.

DETAILED DESCRIPTION OF THE INVENTION

Preferred embodiments of the present invention will be described below with reference to the accompanying drawings.

Figure 6:
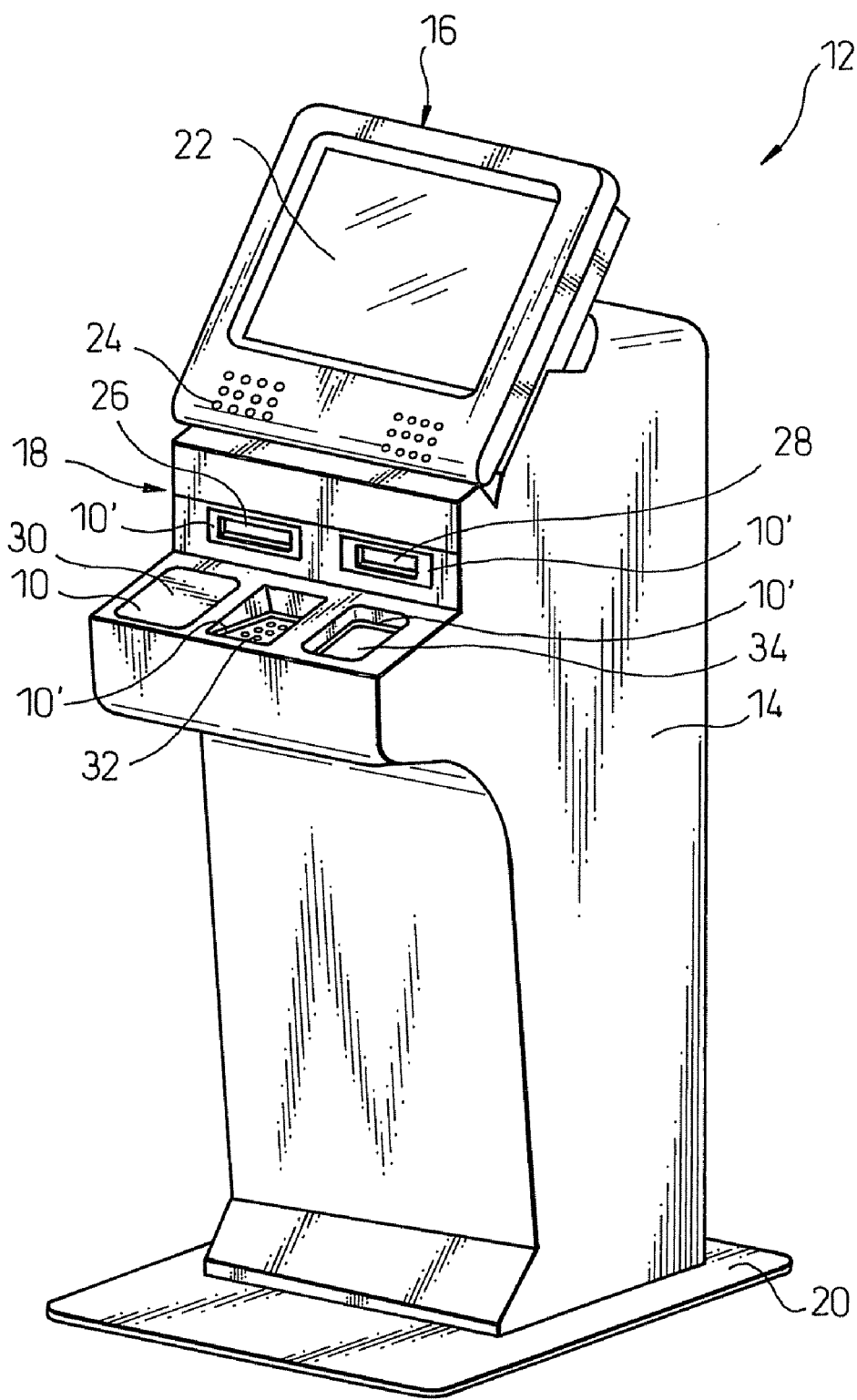
FIG. 6 is a perspective view showing a general configuration of an information kiosk terminal using a surface light-emitting device according to the present invention.

First, referring to FIG. 6, a general configuration of an information kiosk terminal 12 using a surface light-emitting device or surface illumination device 10 according to the present invention will be described. Information kiosk terminal 12 includes a pedestal 14 installed on a floor surface, a display unit 16 mounted on a top of pedestal 14, and a transaction unit 18 provided on a front surface of an upper part of pedestal 14. A bottom plate 20 having a larger area than that of an installation surface for pedestal 14 may be attached to the bottom of pedestal 14 to secure stability.

Display unit 16 is provided with a touch panel 22, which allows an operator to input information or select instructions by touching a screen of touch panel 22. Touch panel 22 is a commonly-used one and therefore detailed explanation thereof will be omitted. A speaker unit 24 is provided below Touch panel 22 is provided at the lower part thereof with a speaker unit 24 to provide an operating sound and a guide voice. Further, display unit 16 is swingably mounted on pedestal 14 so that a tilt of display unit 16 can be adjusted in accordance with an operator position.

Transaction unit 18 is provided with a printer unit for printing on paper, a magnetic card reader unit for reading off a magnetic card, a non-contact IC card unit for reading information stored on the noncontact IC card and writing information on the non-contact IC card by communication, and input/output interface units such as a keypad unit for inputting a personal identification number or other numerical characters, and an image scanner unit for reading a two-dimensional bar code and information displayed on the nonmagnetic card. In the shown embodiment, a projected portion 36 projecting forward from a front surface of transaction unit 18 is provided inside with a non-contact IC card unit, a keypad unit and an image scanner unit, while the top surface of projected portion 36 is formed with, starting from the left in FIG. 6, a card port surface 30 of the non-contact IC card unit, a keypad 32 of the key pad unit and a scan surface 34 of the image scanner unit. A front vertical surface of transaction unit 18 provided above projected portion 36 is formed with, starting from the left in FIG. 6, a paper discharge port 26 for discharging paper from the printer unit and a card insertion hole 28 for inserting a card therethrough into the magnetic card reader unit. However, the arrangement of these input/output interface units is not limited to the one shown in the embodiment, but may be appropriately selected.

Each of the input/output interface units of transaction unit 18 includes a surface light-emitting device or surface illumination device 10 or 10' to guide the operator by emitting light when requesting the operator to perform specific operation. Specifically, surface light emitting device 10 is provided to emit light from the entire card port surface 30 of the non-contact IC card port unit, and other surface light-emitting devices 10' are provided to emit light from surfaces around paper discharge port 26 of the printer unit, card insertion hole 28 of the magnetic card reader unit, keypad 32 of the keypad unit and scan surface 34 of the image scanner unit, respectively.

Referring to FIGS. 1 to 5, surface light-emitting devices 10, 10' used for the input/output interface units will be described in detail.

Figure 1:
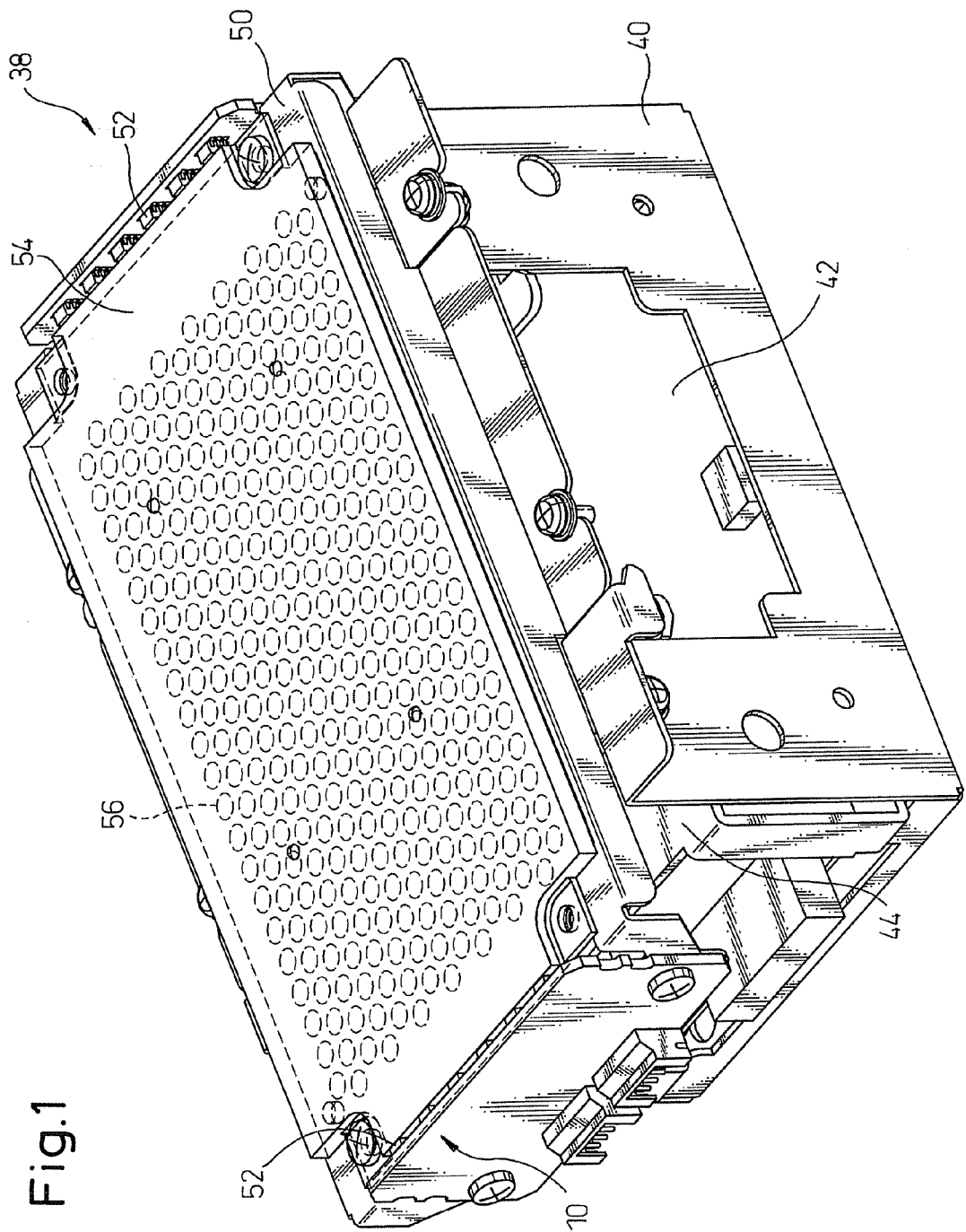
FIG. 1 is a perspective view of a non-contact IC card port unit using a surface light-emitting device according to an embodiment of the present invention.
Figure 2:
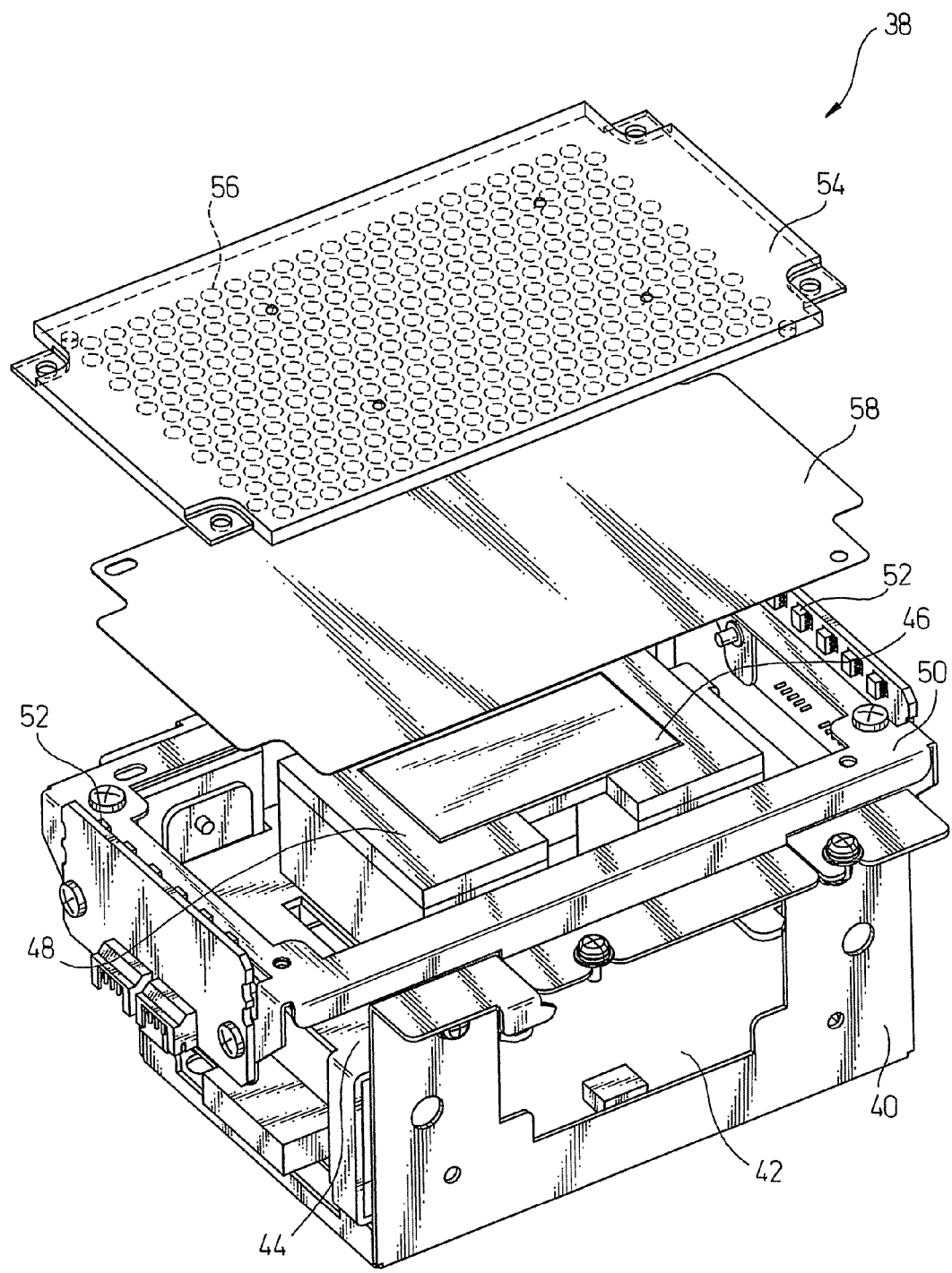
FIG. 2 is an exploded view of the non-contact IC card port unit shown in FIG. 1.

FIG. 1 is a perspective view of a non-contact IC card unit 38 removed from transaction unit 18, and FIG. 2 is an exploded view of non-contact IC card unit 38 shown in FIG. 1.

Non-contact IC card unit 38 includes a casing 40, a control board 42 mounted to the bottom part of casing 40, and a communication unit 46 (FIG. 2) mounted on a support bracket 44 supported above control board 42. Control board 42 is connected to a communication unit 46 to control the operation of communication unit 46. Communication unit 46 is preferably mounted on support bracket 44 via an elastic member 48 such a foam material provided so as to surround the bottom and peripheral side surfaces of communication unit 46.

Surface light-emitting device 10 according to the present invention is mounted on the top part of casing 40. Surface light-emitting device 10 includes a substantially rectangular frame 50 mounted to the top part of casing 40, light sources 52 mounted on a pair of opposed sides of frame 50 so as to illuminate the inside of frame 50, and a transparent plate 54 mounted on frame 50 so as to be interposed between light sources 52 mounted on the pair of the opposed sides of frame 50. Each light source 52 is preferably configured of one or more LEDs and a control board for controlling the light emission thereof, but an electric bulb may be used instead of a LED. The plate can be made of any appropriate transparent material and is preferably made of a transparent plastic material such as transparent acrylic resin, polycarbonate or ABS (acrylonitrile-butadiene-styrene).

Figure 3:
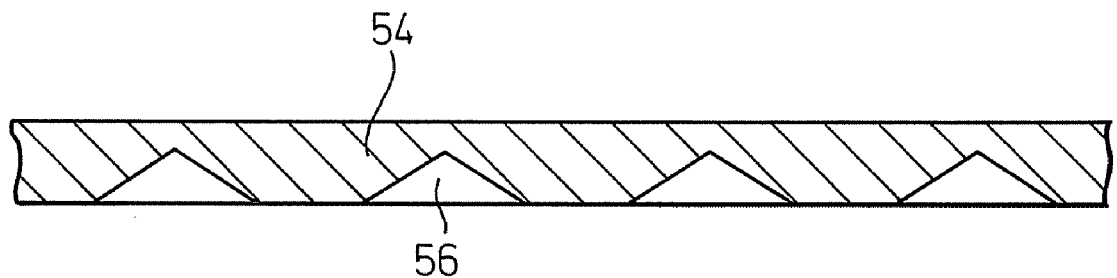
FIG. 3 is a enlarged sectional view of a part of the surface light-emitting device shown in FIG. 1.
Figure 4A:
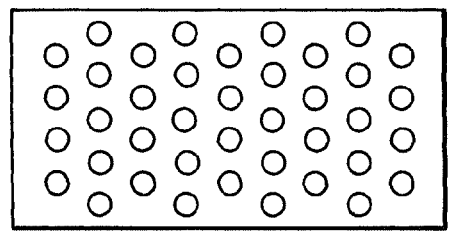
FIGS. 4A to 4D are diagrams showing various examples of the arrangement of plate dimples.
Figure 4B:
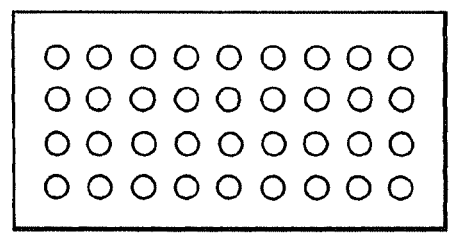
Figure 4C:
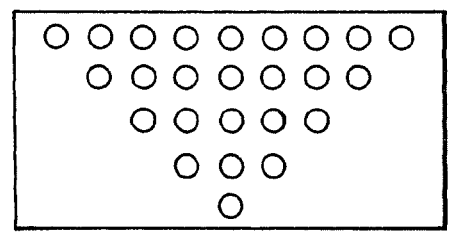
Figure 4D:
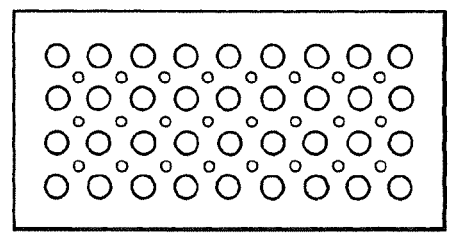

As shown in FIG. 3 illustrating an enlarged sectional view of a part of plate 54, plate 54 has two main surfaces and is formed with a multiplicity of cone-shaped dimples 56 over substantially the whole of one of the two main surfaces thereof. Plate 54 is mounted on the frame 50 with one main surface having dimples 56 (hereinafter referred to as dimpled main surface) directed to the inside of casing 40 and the other main surface having no dimples 56 (hereinafter referred to as the plain main surface) directed to the outside of casing 40. Dimples 56 may be formed by machining, such as drilling, or molding. Further, dimples 56 of the same size may be arranged regularly, or dimples 56 may be arranged in a predetermined pattern by including dimples of different sizes or changing arrangement density of dimples. For example, dimples 56 may be regularly arranged as shown in FIGS. 4A and 4B or in an arbitrary shape such as an arrow head as shown in FIG. 4C, or dimples of different sizes are arranged as shown in FIG. 4D.

Between frame 50 and plate 54, a back sheet 58 is preferably provided on the side of the dimpled main surface of plate 54 so as to efficiently reflect light from light sources 52 toward the outside of casing 40. Back sheet 58 can be of any arbitrary color in accordance with apparatus design, but is preferably of a thick color so as to easily reflect light, more preferably of black color. Any arbitrary material can be used for the material of back sheet 58 as long as the communication between communication unit 46 and non-contact IC card is not interrupted when the non-contact IC card is arranged on the side of the combination of plate 54 and back sheet 58 far from communication unit 46.

Surface light-emitting device 10 configured in this way is mounted above non-contact IC card unit 38, so that the plain main surface of plate 54 forms card port surface 30 of non-contact IC card unit 38. In surface light-emitting device 10, when light is radiated toward the inside of plate 54 from the side of plate 54 by light sources 52 mounted on the opposed sides of frame 50, radiated light is reflected toward the plain main surface of plate 54 by back sheet 58 and the cone-shaped surfaces of dimples 56 formed on plate 54. Since cone-shaped dimples 56 are arranged substantially over the whole of one main surface of plate 54, plate 54 can emit light from the whole of the main surface thereof and illuminate the whole of card port surface 30 of non-contact IC card unit 38. Therefore, surface light-emitting device 10 allows light to be emitted from a larger area than the conventional guide lamps, so that a larger area can be illuminated with a simpler structure and more easily recognized by the operator.

Since light sources 52 are arranged on the side of plate 54 but not on the side facing the plain main surface of plate 54, light sources 52 cannot be obstacles to installation of other units such as communication unit 46. Therefore, other units such as communication unit 46 can be freely disposed on the side facing the plain main surface of plate 54 (i.e., under plate 54) of surface light-emitting device 10.

Further, a light reflection condition can be changed by changing the size or arrangement density of dimples 56 of plate 54, thereby making a predetermined pattern or characters appear on plate 54. By using LEDs of a plurality of colors as light sources 52 and controlling light emission thereof, light of different colors can be emitted from card port surface 30 in accordance with intended different purposes.

On the other hand, FIG. 5 is a perspective view of the surface light-emitting device 10' used to emit light from the surfaces around discharge paper port 26 of the printer unit, card insertion hole 28 of the magnetic card reader, key pad 32 of the key pad unit and scan surface 34 of the image scanner unit, i.e., illuminate the surfaces around them. In FIG. 5, the parts corresponding to those of surface light-emitting device 10 shown in FIG. 1 are designated by the same reference numerals, respectively.

Surface light-emitting device 10' shown in FIG. 5 has the substantially same configuration as that of surface light-emitting device 10, but is different from surface light-emitting device 10 in that openings 60, 62 are formed at the center of plate 54 and back sheet 58. Formation of openings 60, 62 at the center of plate 54 and back sheet 58 of surface light-emitting device 10' makes it possible to expose, through openings 60, 62, paper discharge port 26 of the printer unit, card insertion hole 28 of the magnetic card reader unit, keypad 32 of the key pad unit or scan surface 34 of the image scanner unit to the operator side. The remaining parts of surface light-emitting device 10' are similar to the corresponding ones of surface light-emitting device 10 shown in FIG. 1, and therefore, a detailed explanation thereof will be omitted. Further, the operation and effects of surface light-emitting device 10' shown in FIG. 5 are similar to those of surface light-emitting device 10 shown in FIG. 1, and therefore, a detailed explanation thereof will be omitted.

Although surface light-emitting devices 10, 10' according to the present invention and information kiosk terminal 12 using them have been described with reference to the embodiments shown in the drawings, the present invention is not limited to these embodiments. For example, in the embodiments shown in the drawings, information kiosk terminal 12 is used as an example of the automated transaction apparatus. However, surface light-emitting devices 10, 10' according to the present invention can be applied to an automated teller machine or another type of automated transaction apparatus. In the shown embodiments, light sources 52 are also arranged adjacent to one pair of opposed sides of plate 54 of surface light-emitting devices 10, 10'. However, light sources 52 may be arranged adjacent to the other pair of the opposed sides of plate 54. Further, in the embodiment shown in FIG. 1, light sources 52 are arranged adjacent to both of opposed sides of plate 54. However, light source 52 may be arranged adjacent to only one side thereof.

What is claimed is:

1. A surface light-emitting device for emitting light from a surface having a wide area, comprising a transparent plate having two main surfaces and a light source,
   wherein said light source is arranged adjacent to a side of said transparent plate so that said light source radiates light to the inside of said transparent plate from the side of said transparent plate, and one main surface of said transparent plate is formed with a plurality of cone-shaped dimples which reflect radiated light toward the other main surface of said transparent plate,
   wherein an opening is formed at a center of said transparent plate.

2. The surface light-emitting device according to claim 1, further comprising a back sheet arranged adjacent to said one main surface formed with said plurality of cone-shaped dimples.

3. The surface light-emitting device according to claim 1, wherein said plurality of cone-shaped dimples include dimples having different sizes.

4. The surface light-emitting device according to claim 2, wherein said plurality of cone-shaped dimples include dimples having different sizes.

5. The surface light-emitting device according to claim 1, wherein said plurality of cone-shaped dimples are arranged so as to display a predetermined pattern on said other main surface of said transparent plate.

6. The surface light-emitting device according to claim 2, wherein said plurality of cone-shaped dimples are arranged so as to display a predetermined pattern on said other main surface of said transparent plate.

7. The surface light-emitting device according to claim 3, wherein said plurality of cone-shaped dimples are arranged so as to display a predetermined pattern on said other main surface of said transparent plate.

8. The surface light-emitting device according to claim 4, wherein said plurality of cone-shaped dimples are arranged so as to display a predetermined pattern on said other main surface of said transparent plate.

9. The surface light-emitting device according to claim 1, wherein said transparent plate is made of a transparent plastic material.

10. An automated transaction apparatus using the surface light-emitting device according to claim 1 as a guide device for an input/output interface unit.

11. The automated transaction apparatus according to claim 10, wherein said surface light-emitting device is arranged so as to surround said input/output interface unit.

12. The automated transaction apparatus according to claim 10, comprising an information kiosk terminal.

* * * * *